T. ROGATCHOFF.
CROSS HEAD FOR ENGINES.
APPLICATION FILED DEC. 9, 1918.
1,303,728.
Patented May 13, 1919.
2 SHEETS—SHEET 2.
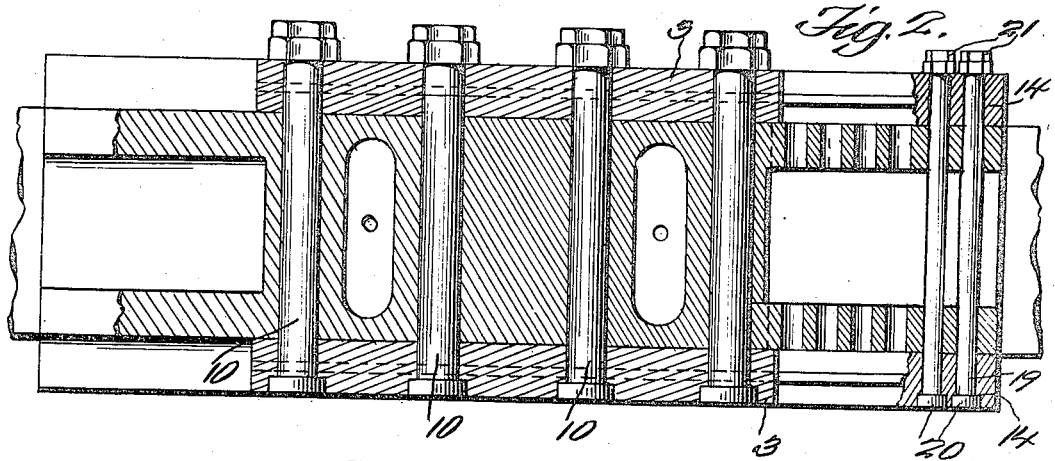
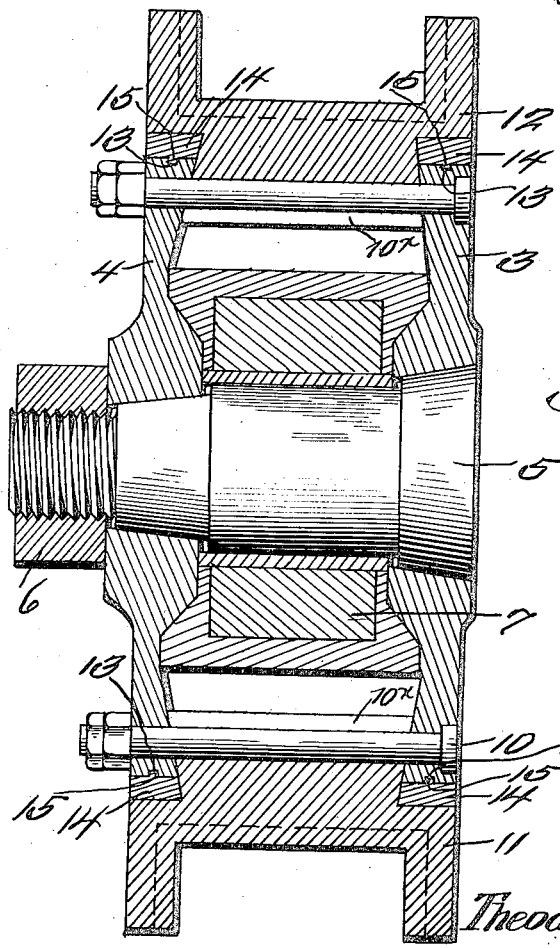
Witnesses
R. A. Boswell.
Inventor
Theodore Rogatchoff
By A. L. Hough
Attorneys

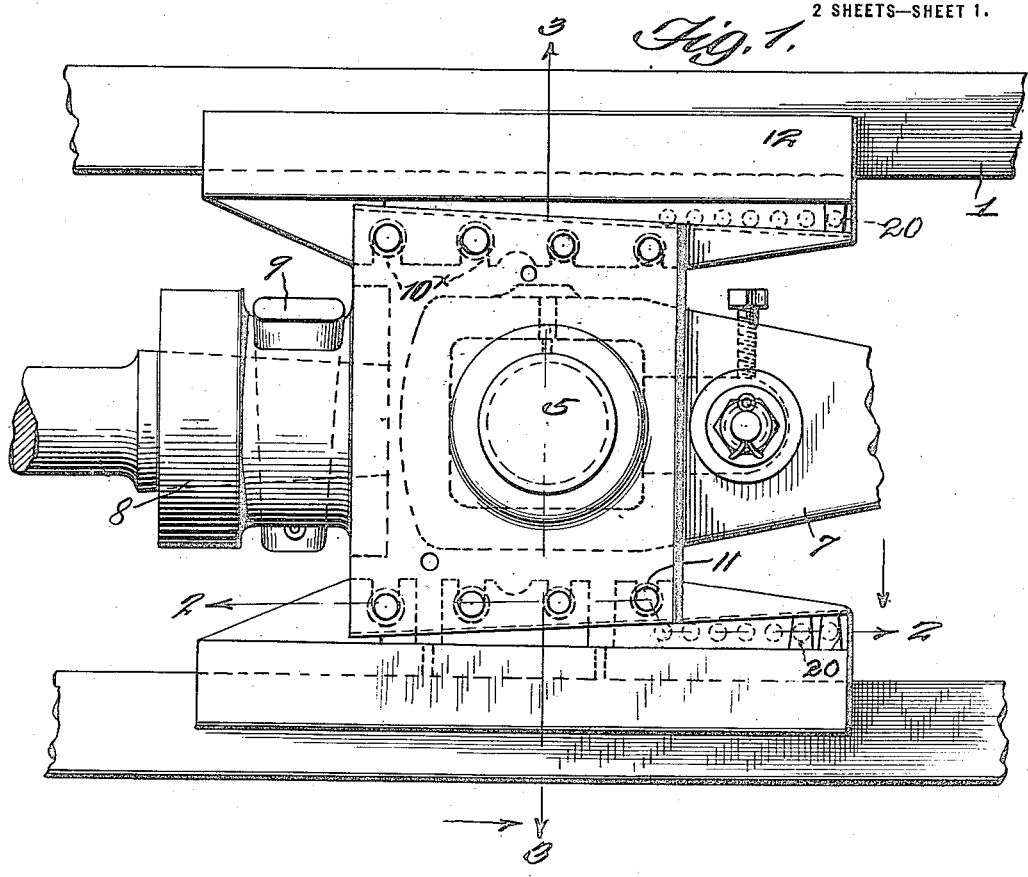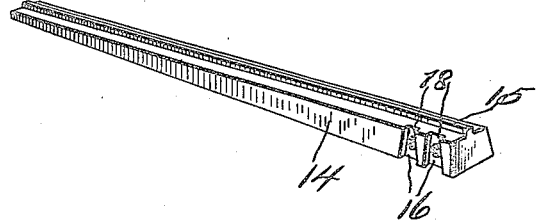

UNITED STATES PATENT OFFICE.

THEODORE ROGATCHOFF, OF BALTIMORE, MARYLAND.

CROSS-HEAD FOR ENGINES.

1,303,728.

Specification of Letters Patent. Patented May 13, 1919.

Application filed December 9, 1918. Serial No. 265,954.

*To all whom it may concern:*

Be it known that I, THEODORE ROGATCHOFF, a citizen of the Republic of Russia, residing at Baltimore, in the city of Baltimore and State of Maryland, have invented certain new and useful Improvements in Cross-Heads for Engines, of which the following is a specification, reference being had therein to the accompanying drawing.

This invention relates to new and useful improvements in adjustable cross heads and consists essentially in the provision of means for taking up wear, comprising wedge shaped members guided in grooves in the cross head, and having means for holding the gibs in adjusted positions.

The invention consists further in the provision of a cross head made up of sections held together by bolts and having dovetailed connection with gibs, which are held in different adjusted positions through the medium of longitudinally movable wedge members.

The invention comprises a simple and efficient device of this character having various other details of construction, combination and arrangement of parts which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is a side elevation of a cross head made in accordance with my invention.

Fig. 2 is a sectional view on line 2—2 of Fig. 1.

cross heads, and 8' designates a piston stem fastened to the cross head by the key 9.

Bolts 10 pass through apertures in the sides of the cross head and also in channels or grooves 10× formed in the inner edges of the two gibs, said gibs being shown in dotted lines in Fig. 1 of the drawings. It will be noted that the opposite faces of the gibs are provided with recesses, one wall of each recess being beveled or inclined and its outer wall at right angles to the outer face of the gib, the inclined wall of the recess being engaged by the inclined portion upon the inner portions of the sides 3 and 4, thus forming a dove-tailed connection. The bolts 10 have heads countersunk in the side 3 and nuts are fitted to the threaded ends of the bolts to hold the sides against the gibs. The opposite edges of the sides 3 and 4 are inclined, as shown in Fig. 1 of the drawings, and each inclined edge of the side is provided with a longitudinal channel or groove 13, as shown in Fig. 3 of the drawings and in dotted lines in Fig. 1.

Adjustable wedging members 14, a detail of one of which is shown in Fig. 4 of the drawings, are provided each with a central longitudinal rib 15 adapted to engage and have a movement within a groove in one of said sides, the inner face of each wedging member being inclined, as shown in Fig. 3 of the drawings. The said members 14 on the side 3 have each two recesses 16 in the faces thereof and apertures 18 leading through the members from the bottoms of the recesses, it being noted that by the provision of a plurality of said apertures, prothe bolts, as shown and described. The gibs are permitted to be moved outwardly in opposite directions by reason of the bolts 19 passing through the grooves in the shank portions of the gibs and which bolts are held stationary in apertures in the gibs themselves. Said gibs are held securely by dove-tailed connections through the medium of the bolts 10, thus securely holding the parts together.

What I claim to be new is:

1. An adjustable cross head having sides spaced apart, the inner faces of said sides having beveled portions, gibs having recesses upon their opposite faces and transverse grooves upon their inner faces, the adjacent walls of the recesses being beveled conforming to and engaging the beveled portions of said sides, bolts passing through registering apertures in said sides and grooves, and wedging members movable intermediate the sides and outer walls of said recesses in the gibs.

2. An adjustable cross head having sides spaced apart, the inner faces of said sides having beveled portions, gibs having recesses upon their opposite faces and transverse grooves upon their inner faces, the opposite edges of said sides being inclined, the adjacent walls of the recesses being beveled conforming to and engaging the beveled portions of said sides, bolts passing through registering apertures in said sides and grooves, and wedging members movable intermediate the sides and outer walls of said recesses in the gibs, and means for guiding the wedging members in their longitudinal movements.

3. An adjustable cross head having sides spaced apart and having inclined portions upon the inner faces thereof, gibs recessed upon their opposite faces, the adjacent walls of the recesses being inclined and conforming to and adapted to have moving contact with the beveled portions of said sides, the inner faces of the gibs being provided with transverse grooves, bolts passing through registering apertures in said sides and grooves, the opposite edges of the sides being inclined, wedging members interposed between the inclined edges of the sides and the outer walls of the recesses of the gibs, and having tongue and groove connection with each other, and means for holding the wedging members in adjusted positions.

4. An adjustable cross head having sides spaced apart, and having inclined portions upon the inner faces thereof, gibs recessed upon their opposite faces, the adjacent walls of the recesses being inclined and conforming to and adapted to have moving contact with the beveled portions of said sides, the inner faces of the gibs being provided with transverse grooves, bolts passing through registering apertures in said sides and grooves, the opposite edges of the sides being inclined, and each having a longitudinal groove, wedging members interposed between the inclined edges of the sides and the outer walls of the recesses of the gibs, and each having a rib engaging a groove in said edge, and means for holding the wedging members in adjusted positions.

5. An adjustable cross head having sides spaced apart, and having inclined portions upon the inner faces thereof, gibs recessed upon their opposite faces, the adjacent walls of the recesses being inclined and conforming to and adapted to have moving contact with the beveled portions of said sides, the inner faces of the gibs being provided with transverse grooves, bolts passing through registering apertures in said sides and grooves, the opposite edges of the sides being inclined, and each having a longitudinal groove, wedging members interposed between the inclined edges of the sides and the outer walls of the recesses of the gibs, and each having a rib engaging a groove in said edge, and means for holding the wedging members in adjusted positions.

In testimony whereof I hereunto affix my signature.

THEODORE ROGATCHOFF.